United States Patent [19]
Wardavoir

[11] Patent Number: 5,421,284
[45] Date of Patent: Jun. 6, 1995

[54] SUPPORT AND CONTROL DEVICE FOR A RETRACTABLE VEHICLE WINDSHIELD AND VEHICLE EQUIPPED WITH SUCH A DEVICE

[75] Inventor: Francois Wardavoir, Cellettes, France

[73] Assignee: Hobbycar, Thenay, France

[21] Appl. No.: 131,699

[22] Filed: Oct. 5, 1993

[30] Foreign Application Priority Data

Oct. 5, 1992 [FR] France ............................. 92 11773

[51] Int. Cl.⁶ ............................................. B63B 17/00
[52] U.S. Cl. ................................................. 114/361
[58] Field of Search .............. 114/343, 361, 362, 363, 114/364; 296/84.1, 86, 88, 92

[56] References Cited

U.S. PATENT DOCUMENTS 3,026,140 3/1962 Schutte .
3,099,023 7/1963 Buchholz et al. ..................... 114/361
3,134,112 5/1964 Hage ..................... 114/361
3,906,563 9/1975 Bramhall ............................. 114/361
4,423,695 1/1984 Rougerie ............................... 114/66

FOREIGN PATENT DOCUMENTS 977400 3/1951 France .
2620395 3/1989 France .
2630052 10/1989 France .

*Primary Examiner*—Stephen P. Avila
*Attorney, Agent, or Firm*—Young & Thompson

[57] ABSTRACT

A device for supporting and controlling a retractable windshield of an outdoor vehicle, which comprises a central lever (4) extending overall along a middle longitudinal vertical plane (P) of the vehicle and articulated to the transverse lower edge (5) of the windshield (2) and to the fixed structure (6) of the vehicle. The invention also relates to a vehicle (3) comprising such a support and control device.

13 Claims, 4 Drawing Sheets

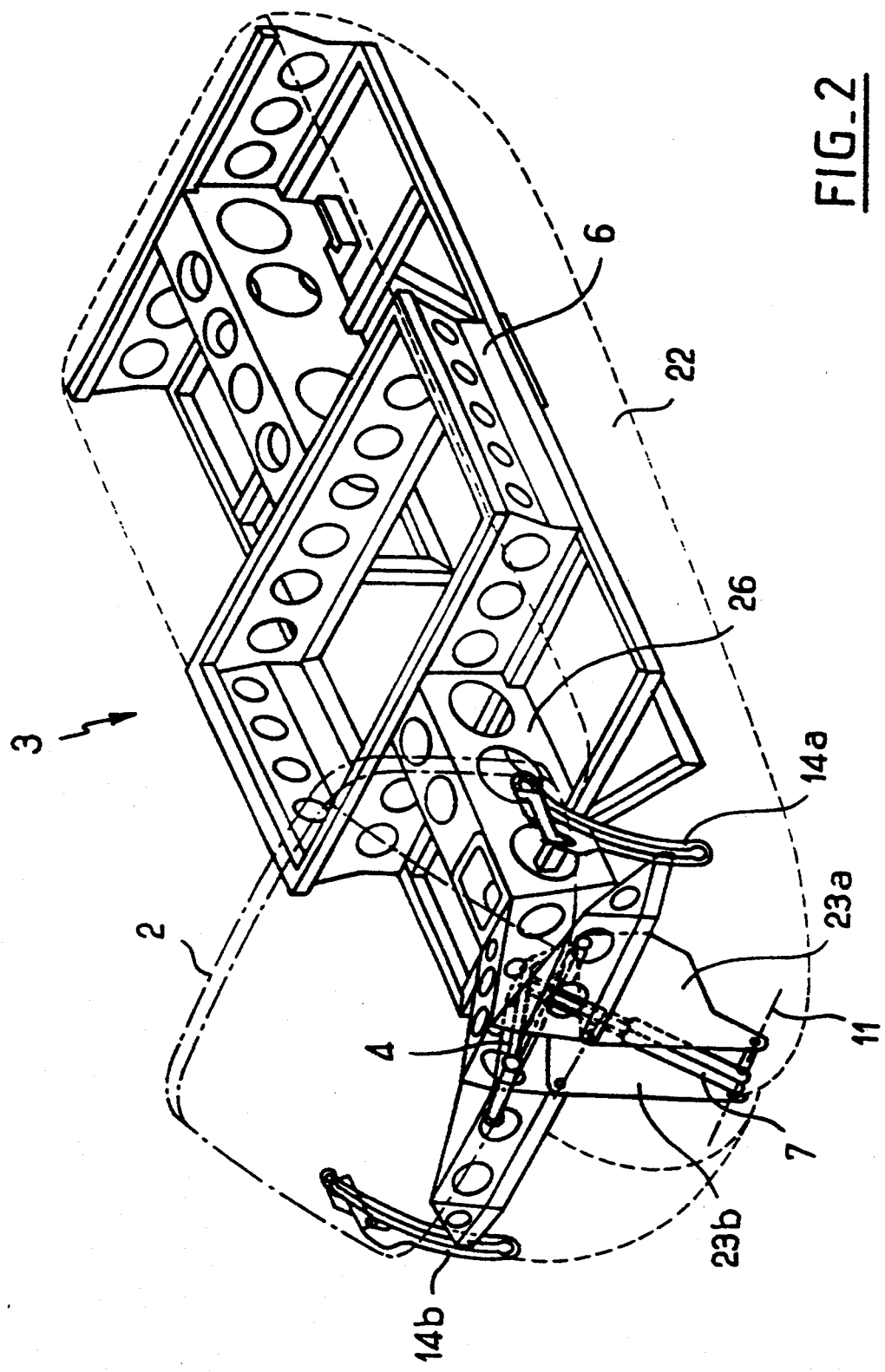
FIG._2

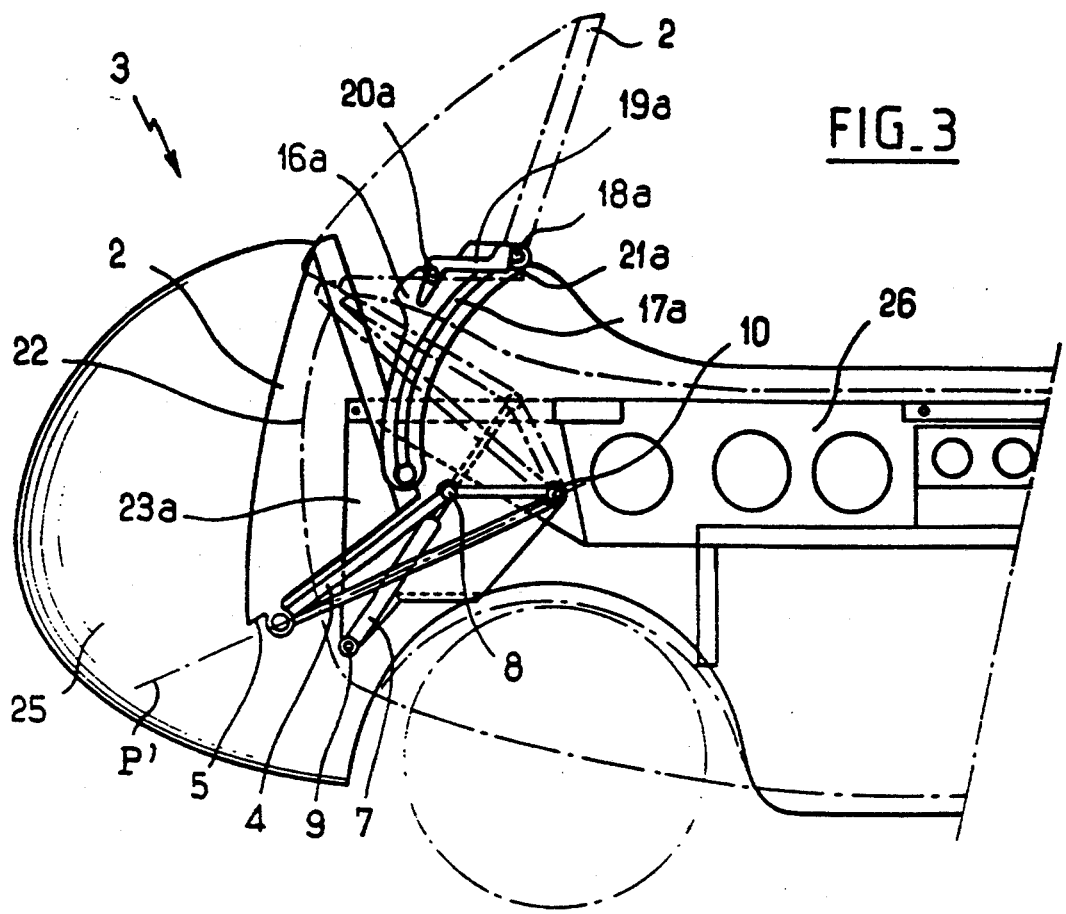
FIG_3
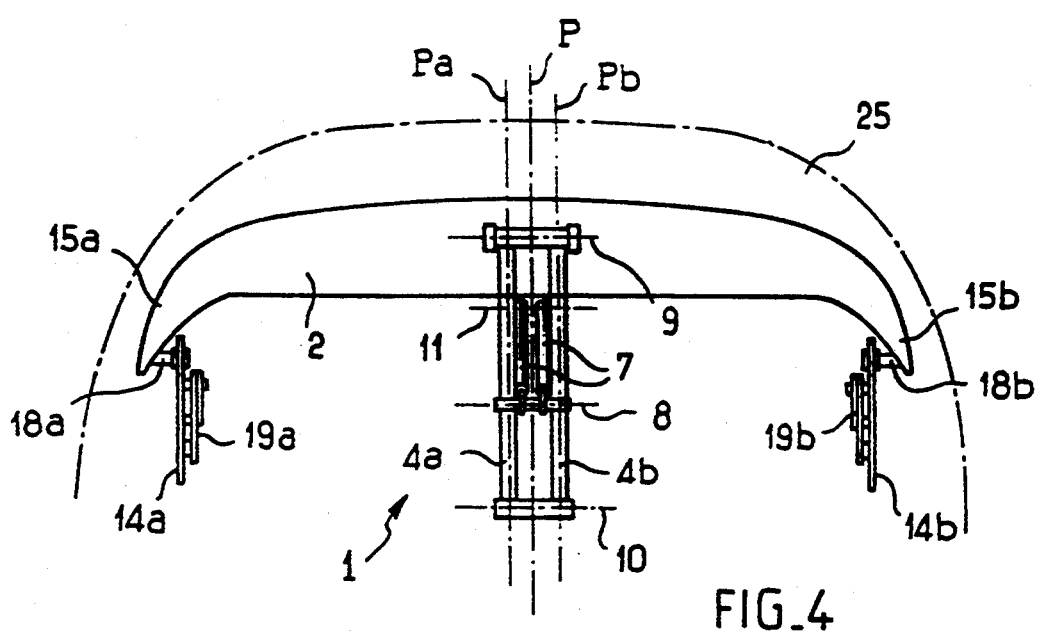
FIG_4

SUPPORT AND CONTROL DEVICE FOR A RETRACTABLE VEHICLE WINDSHIELD AND VEHICLE EQUIPPED WITH SUCH A DEVICE

FIELD OF THE INVENTION

The invention relates to a support and control device for a retractable outdoor vehicle windshield.

BACKGROUND OF THE INVENTION

French Patent Application FR-A-2,620,395 already describes an outdoor vehicle—in particular an amphibious vehicle—provided with a windshield which can be retracted between a raised position in which it can protect the occupants of the open-top vehicle and a position retracted behind a front panel of the body so that the vehicle has a loading plane extending over the entire upper surface.

In this document, the windshield which is flat is supported and guided by bearing surfaces, housings and slides extending transversely. These guide and support elements therefrom impose large transverse encumbrance to the front part of the vehicle, which impairs in particular its aerodynamic or hydrodynamic characteristics. Furthermore, the guiding and supporting of the windshield have insufficient rigidity and do not allow sufficiently reliable blocking of the windshield, in particular in the raised position in which the users can lean on the windshield to enter or leave the vehicle. In addition, the known guide and support elements do not allow a windshield of skew shape to be used.

SUMMARY OF THE INVENTION

The invention therefore aims to overcome these drawbacks by providing a support and control device for a retractable windshield which has low encumbrance—in particular in the transverse direction and in the longitudinal direction—which provides perfect rigidity in particular in the raised position of the windshield, and which allows the windshield to be blocked in the raised position. The invention also aims to provide a support and control device which is compatible with an aerodynamic and/or hydrodynamic shape of the front part of the vehicle, and more particularly which is adapted to a windshield of skew shape.

The invention also aims to provide such a support and control device which is motorized, that is to say, by means by which the operations of deploying and retracting the windshield are not carried out manually as in the prior art.

The invention also aims to provide such a support and control device which is extremely simple and inexpensive to manufacture and mount, and more particularly which consists of few pieces.

The invention also aims to provide such a support and control device which can be rigidly combined with the chassis of an amphibious vehicle, in particular a chassis essentially consisting at the front part of the vehicle of a longitudinal middle bar.

More particularly, the invention aims to provide such a support and control device which can be housed between the watertight hull and the front part of the bodywork of an amphibious vehicle without a detrimental effect on the total length of the vehicle or its aerodynamic and/or hydrodynamic characteristics.

For this purpose, the invention relates to a device for supporting the controlling a retractable windshield of an outdoor vehicle, which comprises a central lever extending overall along a middle longitudinal vertical plane of the vehicle and articulated to the lower transverse edge of the windshield and to the fixed structure of the vehicle. The choice of such a lever in a longitudinal central position makes it possible to give the front part of the bodywork curved shapes and to use a windshield of skew shape, while ensuring rigid holding. The lever therefore extends in the longitudinal median part where the most space is available for it to be housed and displaced.

The support and control device according to the invention furthermore comprises a guide slide for each transverse end of the windshield, each guide slide being in the form of a circle portion whose radius corresponds to the length of the central lever, and a means for locking each transverse end of the windshield in the upper position in the slide is provided. Thus, the windshield is guided and supported in the middle central part by the central lever, and at each of its lateral ends by a slide. The slides have extremely low transverse encumbrance and therefore allow complete freedom for determining the shape of the front part of the bodywork of the vehicle. The windshield, which may be of skew shape, is therefore guided and supported permanently by three separate points.

The support and control device according to the invention moreover comprises a central actuating member articulated to the central lever. Here again, the central position of the lever of the actuation member has no detrimental effect on the dimensions and the longitudinal and transverse shape of the bodywork of the vehicle. Furthermore, this central position is perfectly compatible with the kinematics of movement of the windshield and prevents any accidential wedging. The lever and the actuation member can therefore be chosen with small dimensions and characteristics.

According to the invention, the axes of articulation of the central lever to the fixed structure of the vehicle, and of control producing the articulation of the central lever to the windshield, and of actuation producing the articulation of the actuation member to the central lever, allowing free rotation at least about a horizontal direction transverse to the vehicle. Thus, the central lever and the actuation member extend and have movements overall in a longitudinal middle vertical plane of the vehicle.

The invention also relates to an outdoor vehicle which comprises a retractable windshield and a support and control device for this windshield, according to the invention. In particular, the invention relates to an amphibious vehicle comprising a watertight hull surrounding an internal chassis structure and external chassis structures rigidly combined with the internal structure, wherein it comprises a retractable windshield and a support and control device according to the invention, arranged integrally outside the watertight hull and rigidly combined with and carried by external chassis elements. According to the invention, the windshield and the support and control device extend in a transverse housing made between the front face of the hull and the front face of the bodywork of the vehicle, and the hull defines a housing set back towards the rear and upward for the central lever of the support and control device. The central lever may be rigidly combined with and carried by an external chassis element, itself rigidly combined through the hull with a middle longitudinal bar of the internal structure of the chassis. The actuation member may also be carried by the same external chassis element.

The invention also relates to a support and control device and a vehicle comprising a combination of some or all of the characteristics mentioned hereinabove or hereinbelow.

BRIEF DESCRIPTIONS OF THE DRAWINGS

Other characteristics and advantages of the invention will emerge on reading the following description which refers to the attached figures, in which:

FIG. 2 is a perspective view similar to FIG. 1, after assembly.

FIG. 3 is a profile view of the front part of a vehicle according to the invention, equipped with a device according to the invention.

FIG. 4. is a plan of a device according to invention.

Figure 5:
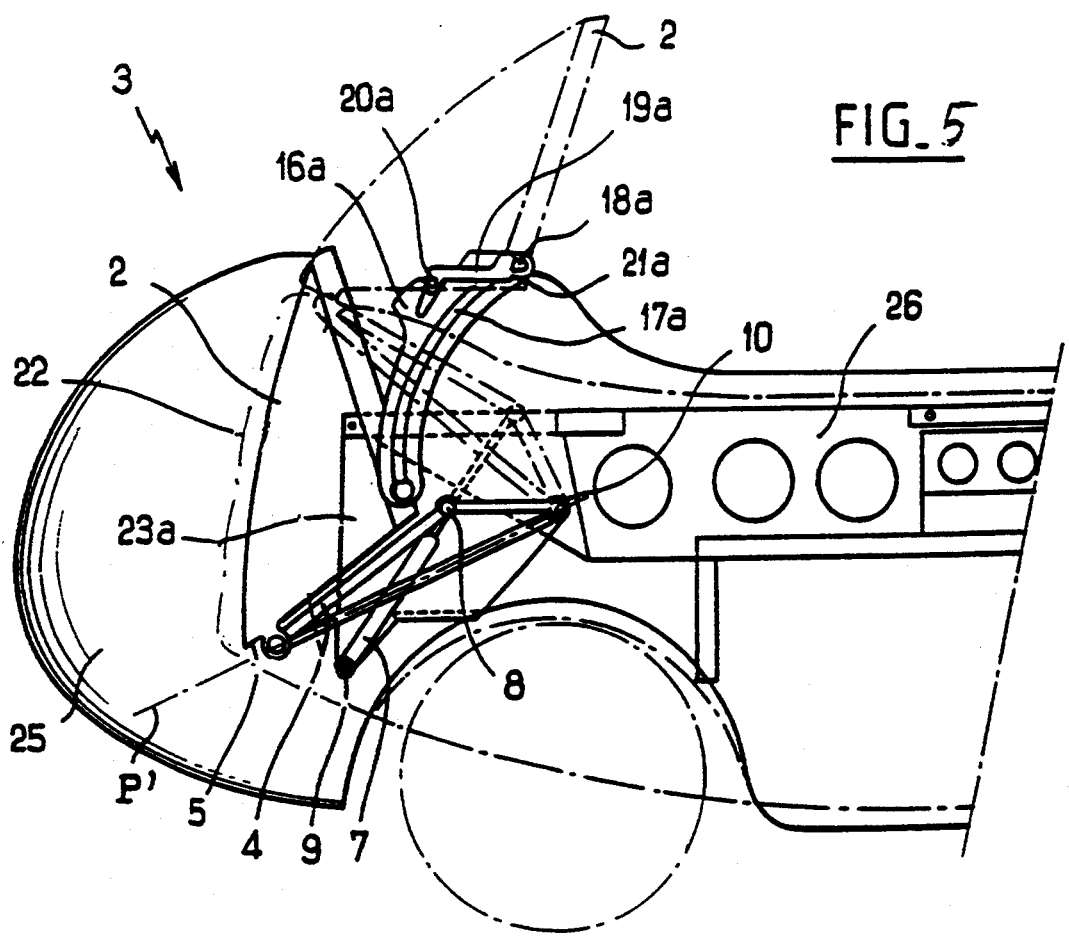

FIG. 5 is a view similar to FIG. 3, showing another embodiment of the device according to the invention.

DETAILED DESCRIPTION OF THE INVENTION

The invention relates to a support and control device 1 for a retractable windshield 2 of an outdoor vehicle 3.

According to the invention, the device 1 comprises a central lever 4 extending overall along a middle longitudinal vertical plane P of the vehicle 3. The central lever 4 is articulated to the transverse lower edge 5 of the windshield 2. The central lever 4 is also articulated to the fixed structure 6 forming a chassis for the vehicle 3.

According to the invention, the device 1 also comprises a central actuation member 7, that is to say one which extends also overall in a middle longitudinal vertical plane P of the vehicle 3. And this central actuation member 7 is also articulated to the central lever 4.

Thus, the central lever 4 defines an actuation axis 8 by which this lever 4 is articulated to the actuation member 7, an articulation axis 9 by which the central lever 4 is articulated at the fixed structure 6 of the vehicle and a control axis 10 by which the central lever 4 is articulated to the lower edge 5 of the windshield 2. According to the invention, the axes of articulation 9, of control 10 and of actuation 8 allow free rotation at least about a horizontal direction transverse to the vehicle 3. All these axes are parallel to each other. Thus, the central lever 4 is free to rotate about the axis 9 of articulation with respect to the fixed structure 6, and free to rotate about the control axis 10 with respect to the windshield 2. And the actuation member 7 is free to rotate with respect to the central lever 4 about the axis 8 of actuation.

According to the invention, the central lever 4 is of the type in which the axis 8 of the actuation is situated between the axis 9 of the articulation to the fixed structure 6 and the control axis 10 articulated to the windshield 2.

Moreover, the actuation member 7 extends overall downwards in the middle longitudinal vertical plane P of the vertical from the axis 8 of actuation by which it is articulated to the central lever 4, and the actuation member 7 bears on the fixed structure 6 by a lower bearing axis 11, that is to say one which is situated at a level lower than the axis 8 of the actuation in any position of the central lever 4. And, according to the invention, the bearing axis 11 of the actuation member 7 is lower than the axis 9 of the articulation of the central lever 4 to the fixed structure 6.

Moreover, according to the invention, the axis 8 of actuation is offset upwards with respect to the plane P′ passing through the axis 9 of the articulation and through the control axis 10. Thus, the three axes 8, 9, 10 of the lever 4 are not in the same plane. The control axis 10 is lower than the axis 9 of articulation when the windshield 2 is in the retracted position, as represented in FIG. 3. Conversely, the control axis 10 is higher than the axis 9 of articulation when the windshield is raised, as represented in dot-and-dash lines in FIGS. 3 and 2.

In the embodiment represented in the figures, the central lever 4 consists of two tubular triangules 4a, 4b, both extending in longitudinal vertical planes Pa, Pb both situated about an equal distance from the middle longitudinal vertical plane of the vehicle 3. And the two triangles 4a, 4b are rigidly combined and held parallel to each other by the axis of articulation 9, of control 10 and of actuation 8 which extend in the horizontal transverse direction of the vehicle 2. The lengths of each of the arms constituting the triangles 4a, 4b of the central lever 4 and their respective angles are determined as a function of the kinematics and the stresses undergone by this lever 4. The two triangles 4a, 4b are separated from each other by a distance sufficient to ensure sufficiently rigid holding of the central lever 4 with respect to the windshield 2 and with respect to the fixed structure 6 of the vehicle.

In a device 1 according to the invention, the actuation member 7 consists of at least one jack 7 whose actuation rod 12 is articulated to the central lever 4 by the axis 8 of actuation, and whose cylinder 13 bears on the fixed structure 6 of the vehicle by the bearing axis 11. In the embodiment represented, the actuation member 7 consists of two parallel and identical jacks 7. The actuation member 7 extends downward and towards the front of the vehicle such that its general direction with respect to the vehicle remains unchanged during the operations of retracting and deploying the windshield 2. Thus, the distance which separates the axis 8 of actuation and the axis 9 of articulation is determined for the direction of the actuation member 7 to remain practically constant during these operations.

Moreover, the device 1 according to the invention furthermore comprises a guide slide 14a, 14b for each transverse end 15a, 15b of the windshield 2, each guide slide 14a, 14b being in the form of a circle portion whose radius corresponds to the length of the central lever 4, that is to say the distance separating the axis 9 of articulation from the control axis 10.

Each guide slide 14a, 14b consists of a curved plate 16a, 16b defining a slot 17a, 17b in the shape of a circle portion, in which a sliding member 18a, 18b, integral with each end 15a, 15b of the windshield 2, slides. Each plate 16a, 16b extends in a vertical longitudinal plane, and each sliding member 18a, 18b extends in a transverse horizontal direction.

The plates 16a, 16b forming the slides 14a, 14b are rigidly combined with the chassis and/or with the bodywork of the vehicle 3, preferably towards the inside of the vehicle with respect to the windshield.

The device according to the invention moreover comprises a means 19a, 19b for locking at each transverse end 15a, 15b of the windshield 2 in the upper position in the slide 14a, 14b. Thus, each locking means 19a, 19b has the function of holding the windshield in the raised position in order to prevent it from being lowered back into the retracted position under the effect of its own weight. Each locking means 19a, 19b consists of a locking lever 19a, 19b articulated by a horizontal axis 20a, 20b transverse to the plate 16a, 16b forming the slide 14a, 14b, on the inside of the vehicle. This lever 19a, 19b comprises an arm whose free end 21a, 21b can be placed in abutment against the sliding member 18a, 18b when the latter is in the extreme upper position of the slot 17a, 17b. This arm then extends at least substantially horizontally between the sliding member 18a, 18b and the axis 20a, 20b of articulation. When the lever 19a, 19b is folded down, the sliding member 18a, 18b is freed and the windshield 2 can be retracted. The movements of the locking lever 19a, 19b can be controlled either manually or by an actuation member provided for this purpose (not shown). The two locking levers 19a, 19b can be controlled by the same actuation member or be joined to each other.

Thus, a device 1 according to the invention consists, as regards its function of holding and support, solely of the central lever 4, two slides 14a, 14b and the central actuation member 7 generating the movements of the windshield. No other lever and no other holding or support member is necessary.

The invention also relates to an outdoor vehicle which comprises a retractable windshield and a device 1 for supporting and controlling this windshield, according to the invention.

More specifically, the invention relates to an amphibious vehicle 3 comprising a watertight hull 22 surrounding on the bottom at least one internal chassis structure 6. The vehicle 3 also comprises external chassis elements 23a, 23b rigidly combined with the internal structure 6 through the watertight hull 22 by bolts. According to the invention, the vehicle 3 comprises a retractable windshield 2 and a device 1 for supporting and controlling the windshield 2 according to the invention, this retractable windshield 2 and this device being arranged integrally outside the leaktight hull 22 and being rigidly combined and carried by external chassis elements 23a, 23b.

According to the invention, the windshield 2 and the support and control device 1 extend in a transverse housing 24 made between the front face of the hull 22 and the front face of the bodywork 25 of the vehicle. More precisely, in a vehicle 3 according to the invention, the watertight hull 22 defines a housing 24 set back towards the rear and upward for the central lever 4 of a device 1 according to the invention. This housing 24 extends overall vertically and symmetrically with respect to the vertical longitudinal middle plane P of the vehicle 3. Its length and its depth are determined to allow the displacement of the central lever 4.

The central lever 4 is rigidly combined and carried by an external chassis element 23a, 23b which is itself rigidly combined through the hull 22 with a middle bar 26 of the internal chassis structure 6.

In the embodiment represented, the actuation member 7 and the central lever 4 are carried by two plates 23a, 23b extending in a longitudinal vertical plane of the vehicle on either side of the middle longitudinal plane P. These two plates 23a, 23b come into contact with two longitudinal vertical walls 27a, 27b of the housing 24 and are combined with the internal structure 6—in particular with the front middle bar 26 of this internal structure 6—through the hull 22 by appropriate bolts. The two external plates 23a, 23b are identical.

Figure 1:
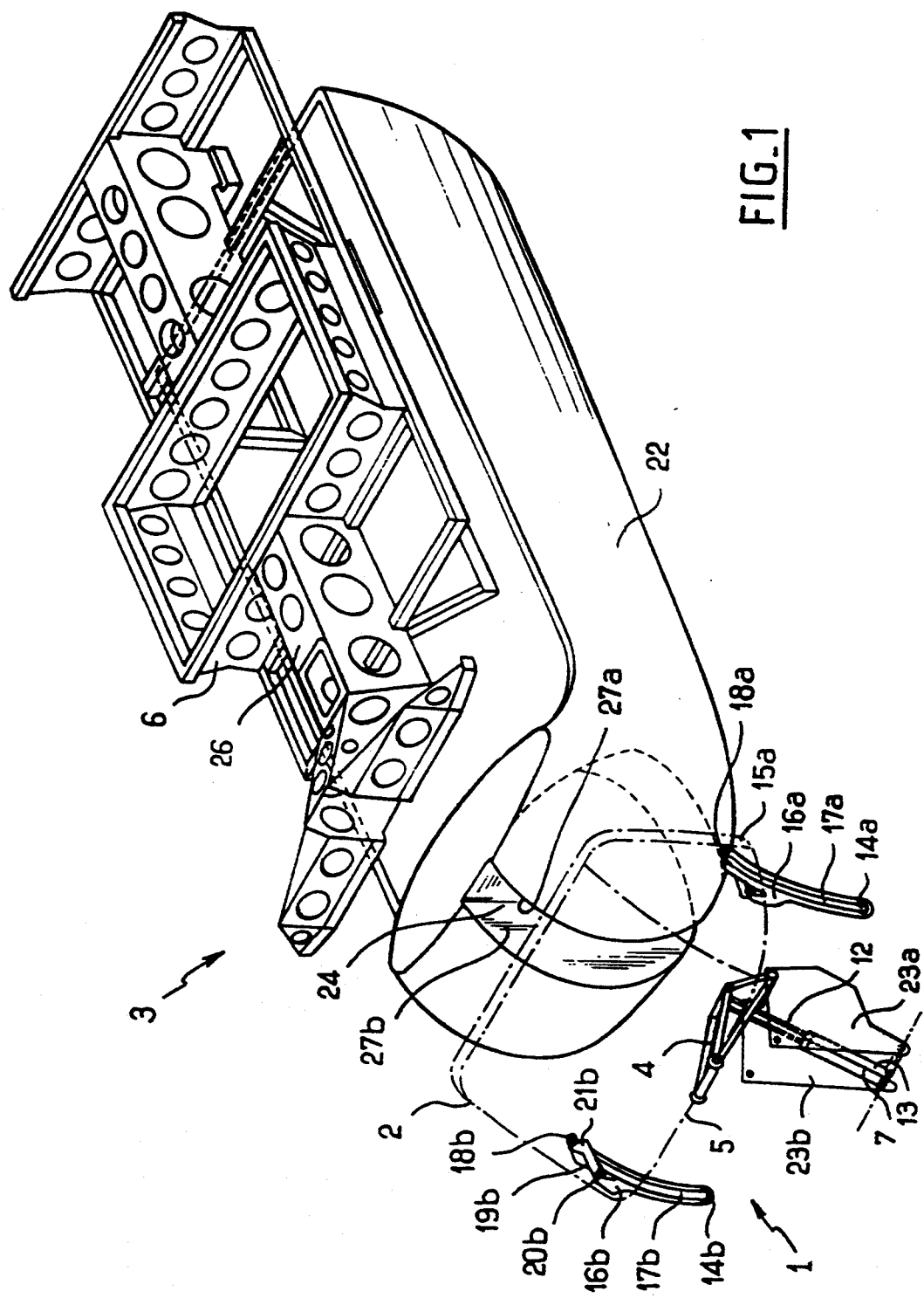
FIG. 1 is an exploded perspective view illustrating the mounting of a device according to the invention on an amphibious vehicle according to the invention.

In FIG. 1, the internal structure 6 forming a chassis for the vehicle, the watertight hull 22, the windshield 2 and the support and control device 1 are represented.

In FIG. 2, all these elements are collected and mounted on each other.

In FIGS. 1 and 2, the hidden lines have been represented. The hull has been represented solely in broken lines and partically for greater clarity in FIG. 2. The bodywork 25 has not been represented in FIGS. 1 2.

In FIG. 3, the hull 22 has been represented in dot-and-dash lines, and the bodywork has been shown transparently to illustrate the operation of the device 1. The windshield 2 has been represented in solid lines in the retracted position and in dot-and-dash lines in the raised position. The locking lever 19a, 19b has been represented in the locking position, with the windshield 2 raised.

In FIG. 4, the support and control device 1 has been represented, and the front part of the bodywork 25 has been represented in dot-and-dash lines.

The support and control device 1 according to the invention is extremely compact, but it nevertheless ensures perfect rigidity and reliable holding of the windshield 2 in the raised position, whilst allowing retraction of the windshield 2 between the hull 22 and the bodywork 25.

FIG. 5 represents another embodiment of the device according to the invention. This time, the windshield 2 and the support and control device extend in a transverse housing made at the front of and inside the hull 22.

In fact, it has been observed that, in the first embodiment, the retraction of the windshield then its return to the normal position, when the amphibious function of the vehicle is used, can impair visibility because water or dirt remains on the inner face of the windshield.

In the second embodiment, the windshield remains isolated from the water and this drawback is avoided. The outer face of the windshield is also kept clean.

I claim:

1. An amphibious vehicle comprising a watertight hull surrounding an internal chassis structure and external chassis elements rigidly combined with the internal chassis structure, a retractable windshield and a device for supporting and controlling said retractable windshield, said device including a lever extending overall along a longitudinal vertical plane of the vehicle and directly articulated by a first end to a transverse lower edge of the windshield and by a second end to said internal chassis structure, said device being arranged integrally outside the watertight hull and rigidly combined with and carried by said external chassis elements.

2. The amphibious vehicle as recited in claim 1, wherein the windshield and the device extend in a transverse housing made between a front face of the hull and a front face of the vehicle.

3. The amphibious vehicle as recited in claim 1, wherein the hull defines a housing set back towards the rear and upward for the lever.

4. The amphibious vehicle as recited in claim 1, wherein the lever is rigidly combined and carried by an external chassis element, itself rigidly combined through the hull with a middle bar of the internal chassis structure.

5. The amphibious vehicle as recited in claim 1, wherein the windshield and the device extend in a transverse housing made at the front of and inside the hull.

6. A device for supporting and controlling a retractable windshield of an outdoor vehicle, to retract the windshield substantially within the vehicle, said device comprising a lever extending overall along a longitudinal vertical plane of the vehicle and directly articulated by a first end to a transverse lower edge of the windshield and by a second end to a fixed structure of the vehicle, an actuation member articulated at the lever about an axis of actuation, the axis of actuation being situated between an axis of articulation to the fixed structure and a control axis articulated to the windshield, the actuation member extending overall downwards in a middle longitudinal vertical plane of the vehicle from the axis of actuation by which it is articulated to the lever, and it bears on the fixed structure by a lower bearing axis.

7. The device as recited in claim 6, wherein the bearing axis is lower than the axis of articulation of the lever.

8. A device for supporting and controlling a retractable windshield of an outdoor vehicle, to retract the windshield substantially within the vehicle, said device comprising a lever extending overall along a longitudinal vertical plane of the vehicle and directly articulated by a first end to a transverse lower edge of the windshield and by a second end to a fixed structure of the vehicle, an actuation member articulated at the lever about an axis of actuation, the axis of actuation being situated between an axis of articulation to the fixed structure and a control axis articulated to the windshield, the axis of actuation being offset upwards with respect to a plane passing through the axis of articulation and the control axis.

9. A device for supporting and controlling a retractable windshield of an outdoor vehicle, to retract the windshield substantially within the vehicle, said device comprising a lever extending overall along a longitudinal vertical plane of the vehicle and directly articulated by a first end to a transverse lower edge of the windshield and by a second end to a fixed structure of the vehicle, an actuation member articulated at the lever about an axis of actuation, the axis of actuation being situated between an axis of articulation to the fixed structure and a control axis articulated to the windshield, the control axis being lower than the axis of articulation when the windshield is retracted and is higher than the axis of articulation when the windshield is raised.

10. A device for supporting and controlling a retractable windshield of an outdoor vehicle, to retract the windshield substantially within the vehicle, said device comprising a lever extending overall along a longitudinal vertical plane of the vehicle and directly articulated by a first end to a transverse lower edge of the windshield and by a second end to a fixed structure of the vehicle, an actuation member articulated at the lever about an axis of actuation, the axis of actuation being situated between an axis of articulation to the fixed structure and a structure and a control axis articulated to the windshield, the axes of articulation, control and actuation allowing free rotation at least about a horizontal direction transverse to the vehicle.

11. The device as recited in claim 10, wherein the actuation member consists of at least one jack whose actuation rod is articulated to the lever and whose cylinder bears on the fixed structure of the vehicle.

12. A device for supporting and controlling a retractable windshield of an outdoor vehicle, to retract the windshield substantially within the vehicle, said device comprising a lever extending overall along a longitudinal vertical plane of the vehicle and directly articulated by a first end to a transverse lower edge of the windshield and by a second end to a fixed structure of the vehicle, an actuation member articulated at the lever about an axis of actuation, the axis of actuation being situated between an axis of articulation to the fixed structure and a control axis articulated to the windshield, the lever consisting of two triangles extending in longitudinal vertical planes and rigidly combined and held parallel to each other by the axes of articulation, control and actuation.

13. A device for supporting and controlling a retractable windshield of an outdoor vehicle, to retract the windshield substantially within the vehicle, said device comprising a lever extending overall along a longitudinal vertical plane of the vehicle and directly articulated by a first end to a transverse lower edge of the windshield and by a second end to a fixed structure of the vehicle, a guide slide for each transverse end of the windshield, in the form of a circle portion whose radius corresponds to the length of the lever, and means for locking each transverse end of the windshield in an upper position in the slide.

* * * * *